(12) United States Patent
Miller

(10) Patent No.: US 6,767,168 B2
(45) Date of Patent: Jul. 27, 2004

(54) METHOD AND APPARATUS FOR FORMING OPENINGS IN A WORKPIECE

(75) Inventor: Raymond T. Miller, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/873,805

(22) Filed: Jun. 4, 2001

(65) Prior Publication Data

US 2002/0025232 A1 Feb. 28, 2002

Related U.S. Application Data

(60) Provisional application No. 60/209,453, filed on Jun. 4, 2000.

(51) Int. Cl.[7] ............................................... B23P 15/42
(52) U.S. Cl. .......................................... 407/13; 407/15
(58) Field of Search .............................. 407/11, 13, 15, 407/17, 67, 69

(56) References Cited

U.S. PATENT DOCUMENTS

| | | | |
|---|---|---|---|
| 1,440,933 A | * | 1/1923 | Perkins et al. |
| 1,744,217 A | | 1/1930 | Forberg |
| 2,538,844 A | | 1/1951 | Nimz |
| 2,998,634 A | * | 9/1961 | Raehrs et al. |
| 3,528,154 A | | 9/1970 | Schmidt |
| 3,548,474 A | | 12/1970 | Meyer |
| 3,641,642 A | | 2/1972 | Schmidt |
| 3,656,220 A | * | 4/1972 | Dupuis |
| 3,707,748 A | | 1/1973 | Price et al. |
| 3,849,852 A | | 11/1974 | Billups |
| 3,914,840 A | * | 10/1975 | Ferree et al. |
| 4,038,730 A | | 8/1977 | Tersch |
| 4,243,347 A | | 1/1981 | Clapp et al. |
| 4,274,766 A | | 6/1981 | Raupp, Jr. et al. |
| 4,454,801 A | | 6/1984 | Spann |
| 4,564,320 A | | 1/1986 | Roseliep |
| 4,614,014 A | | 9/1986 | Ferguson |
| 4,801,226 A | | 1/1989 | Gleason |
| 4,967,458 A | | 11/1990 | Rosenberg et al. |
| 4,993,889 A | | 2/1991 | Kelm |
| 5,008,572 A | | 4/1991 | Marshall et al. |
| 5,242,251 A | | 9/1993 | Armstrong et al. |
| 5,352,068 A | | 10/1994 | Roseliep |
| 5,390,408 A | | 2/1995 | Bishop et al. |
| 5,430,936 A | | 7/1995 | Yazdzik, Jr. et al. |
| 5,473,165 A | | 12/1995 | Stinnett et al. |
| 5,806,169 A | | 9/1998 | Trago et al. |

OTHER PUBLICATIONS

Booklet entitled "*Thermal Surface Treatment Using Intense, Pulsed Ion Beams,*" R.W. Stinnett, R.G. Buchheit, F.A. Greulich, C.R. Hills, A.C. Kilgo, D.C. McIntyre, J.B. Greenly, M.O. Thompson, G.P. Johnston, D.J. Rej, MRS Proceedings Reprint.
Article entitled "*Fässler High Tech for High Expectations.*"
Article entitled "*Ion Beam Surface Treatment a New Capability for the Tool & Die Industry.*"
Booklet entitled "*Ion Beam Surface Treatment Technology*—IBEST".
Article entitled "*DDIN International Quarterly Journal Dedicated to all Segments of the Diecutting Process,*" Robert A. Larson, Larson & Associates.
Article entitled "*Five Best Bets for the Machine–Tool Industry,*" Melissa Lewis, Assistant Editor, Mar., 1997.

* cited by examiner

*Primary Examiner*—John A. Ricci
(74) *Attorney, Agent, or Firm*—Woodard, Emhardt, Moriarty, McNett & Henry LLP

(57) ABSTRACT

A method and apparatus associated with forming a blade attachment slot in a gas turbine engine turbine disk. The method further includes a full-form finish honing that produces a blade attachment slot free of broach ripples. The apparatus includes a broach carrier and cutting inserts coupled to the support. The cutting inserts are interchangeable and can be replaced when worn or damaged. The carrier has integral support members for bracing the cutting inserts. Each cutting insert has lateral support surfaces to prevent the cutting insert from moving laterally within the cutting insert assembly. Further, the broach assembly can be used as a replacement for damaged portions of a broach. The cutting inserts can be manufactured utilizing a fixtured EDM process.

37 Claims, 13 Drawing Sheets

METHOD AND APPARATUS FOR FORMING OPENINGS IN A WORKPIECE

The present invention claims the benefit of U.S. Provisional Application Ser. No. 60/209,453 filed Jun. 4, 2000, which is incorporated herein by reference.

BACKGROUND OF THE INVENTION

The present invention generally relates to machining materials, and more particularly, relates to a method and apparatus for forming openings in a workpiece with a broach and/or a hone. Although the present invention was developed for use in manufacturing gas turbine engine components, many applications may be outside this field.

It is well known that a gas turbine engine integrates a compressor and a turbine having components that rotate at high speeds thereby subjecting the components to significant centrifugal loading during operation of the engine. One component that rotates at high speeds is a disk that carries a plurality of blades that are designed to interact with the working fluid within the gas turbine engine. The plurality of blades is commonly attached to the disk through a blade attachment slot formed therein. Each of the blade attachment slots has a profile, which corresponds with the root of the blade, and has a configuration designed to retain the blade in the slot during operation of the engine. The blade attachment slots are generally of a "fir-tree" configuration to increase the load bearing surface area of the disk, although other configurations are also utilized. Broaching is a technique often utilized for forming blade attachment slots in gas turbine engine disks. The relatively deep slotting generally associated with the formation of blade attachment slots in the disk is a relatively time consuming and costly operation. In a typical broaching process a broaching tool with a series of cutting teeth is pulled through a workpiece to remove material and form the desired opening. Each cutting tooth is typically slightly different from the adjacent cutting teeth, and the broach is designed to gradually remove material from the workpiece and create a blade attachment slot. Broaching tools have been used for many years and include: a unitary broach having a plurality of cutting teeth formed on a single solid broach bar; and an insertable broach including a tool body having a plurality of removable cutting inserts fixed thereto.

Typically, the blade attachment slots are formed in a three-stage broaching operation. The rough shape of the attachment slot is generally formed during an initial rough broaching stage. After the rough broaching stage, an intermediate broaching stage is used to form the intermediate shape of the slot. Finally, a finishing broaching stage is generally used to form the profile of the attachment slot. One limitation associated with many prior three-stage broaching operations is the time required on the broaching machine to form the plurality of blade attachment slots in the disk. Another limitation associated with many prior three-stage broaching operations is the resulting surfaces formed on the disk by the broaching process often have ripples formed thereon as a by-product of the broaching operation. The ripples on the blade attachment slot surfaces can lead to a decreased disk life because of fretting between the blade root and the disk surface during engine operation.

As will be described in detail below, the present invention provides a novel and unobvious method and apparatus for forming openings in a workpiece.

SUMMARY OF THE INVENTION

One form of the present invention contemplates a broach assembly, comprising: a plurality of broaching cutting inserts having a cutting surface; and, a main body member having a plurality of spaced compression mounts formed thereon and aligned in a row, each of the plurality of compression mounts has one of the plurality of cutting inserts positioned therein in an interference fit.

Another form of the present invention contemplates a broach assembly, comprising: a carrier body having a plurality of integral support members aligned in a row and spaced along the carrier body; a plurality of spacers aligned in the row and coupled to the carrier body, one of the plurality of spacers is located between an adjacent pair of the plurality of support members, the pair of the plurality of support members defines a first support member and a second support member, and the one of the plurality of spacers abutting the first support member; and, a cutting insert disposed between the second support member and the one of the plurality of spacers, the cutting insert is wedged between the one of the plurality of spacers and the second support member, and wherein the second support member braces a substantial length of the cutting insert during broaching.

Yet another form of the present invention contemplates a method for reworking a unitary broach bar having a plurality of cutting teeth integrally formed on a broach bar. The method, comprising: providing at least one broach assembly having a carrier with a plurality of cutting inserts; removing a section of the unitary bar including a plurality of cutting teeth; positioning the at least one broach assembly on the broach bar in place of the section after the removing; and, securing the at least one broach assembly to the broach bar with at least one coupling member.

Yet another form of the present invention contemplates a broach, comprising: a broach bar having a first portion including a plurality of integrally formed cutting teeth and a second receiver portion defining a section free of integrally formed cutting teeth; and, at least one broach assembly having a plurality of removebable cutting inserts mechanically coupled thereto, the at least one broach assembly coupled to the broach bar in the second receiver portion.

Still yet another form of the present invention contemplates a method for forming a blade attachment slot in a gas turbine engine disk. The method, comprising: broaching the disk to remove material and define a blade attachment slot of a predetermined profile; and running a substantially full form hone through the predetermined profile to flatten the surfaces of the disk after the broaching and produce a final blade attachment slot profile.

Still yet another form of the present invention contemplates a gas turbine engine disk, comprising: a metallic disk having a first surface and an opposite second surface and a perimeter, the disk has a plurality of spaced blade attachment slots machined therein between the first surface and the opposite second surface and located around the perimeter, and a plurality of surfaces defined on the disk that form the blade attachment slots are substantially smooth and flat after a substantially full form honing process.

One object of the present invention to provide a method and apparatus for forming an opening in a workpiece.

Related objects and advantages of the present invention will be apparent from the following description.

BRIEF DESCRIPTION OF THE DRAWINGS

FIG. 16b illustrates one embodiment of a series of cutting inserts manufactured from the material of FIG. 16a.

DESCRIPTION OF THE PREFERRED EMBODIMENTS

Figure 1:
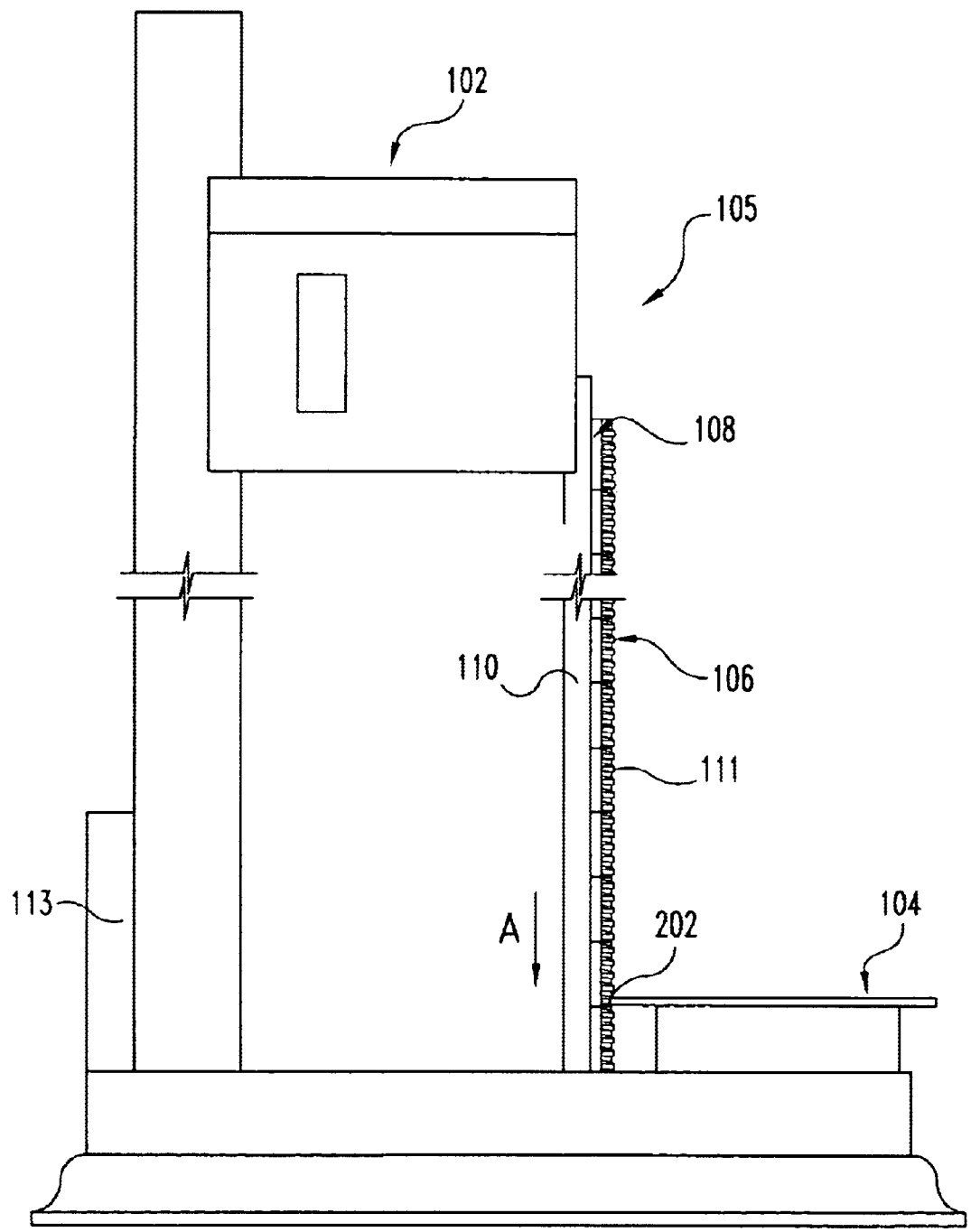
FIG. 1 is an illustrative side view of a broaching machine comprising a broach adapted for machining a workpiece.

For purposes of promoting understanding of the principles of the present invention, reference will now be made to the embodiments illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein are contemplated as would normally occur to one skilled in the art to which the present invention relates.

Referring to FIG. 1, there is illustrated a broaching machine 102 including a broach 105 adapted to form an opening in a component. In one form of the present invention the broaching machine 102 is designed to allow the ready interchange of multiple broaches to facilitate the formation of openings in a component. The broaching machine 102 illustrated in FIG. 1, has a broaching length necessary to allow the deep slot broaching often required to form blade attachment slots in gas turbine engine disks. However, the present invention is applicable with a variety of broaching machines and is not intended to be limited to a machine capable of deep slot broaching. Broaching machine 102 is schematically illustrated moving broach 105 in the direction of arrow A to cut a blade attachment slot 202 in gas turbine engine disk 104.

In one form broach 105 includes a plurality of broach assemblies 106 coupled to a support member 110, and in one embodiment the support member defines a bolster. The plurality of broach assemblies 106 are attached to the bolster 110 and the bolster 110 is coupled to the broaching machine 102. However, the present invention is not limited to a broach having a plurality of broach assemblies and the present invention contemplates a broach having a single broach assembly. Each of the plurality of broach assemblies 106 includes a carrier 108 for supporting a plurality of broach cutting elements 111. Although an external broach is described herein, the present invention also contemplates internal broaches as are believed known to one skilled in the art.

Figure 2:
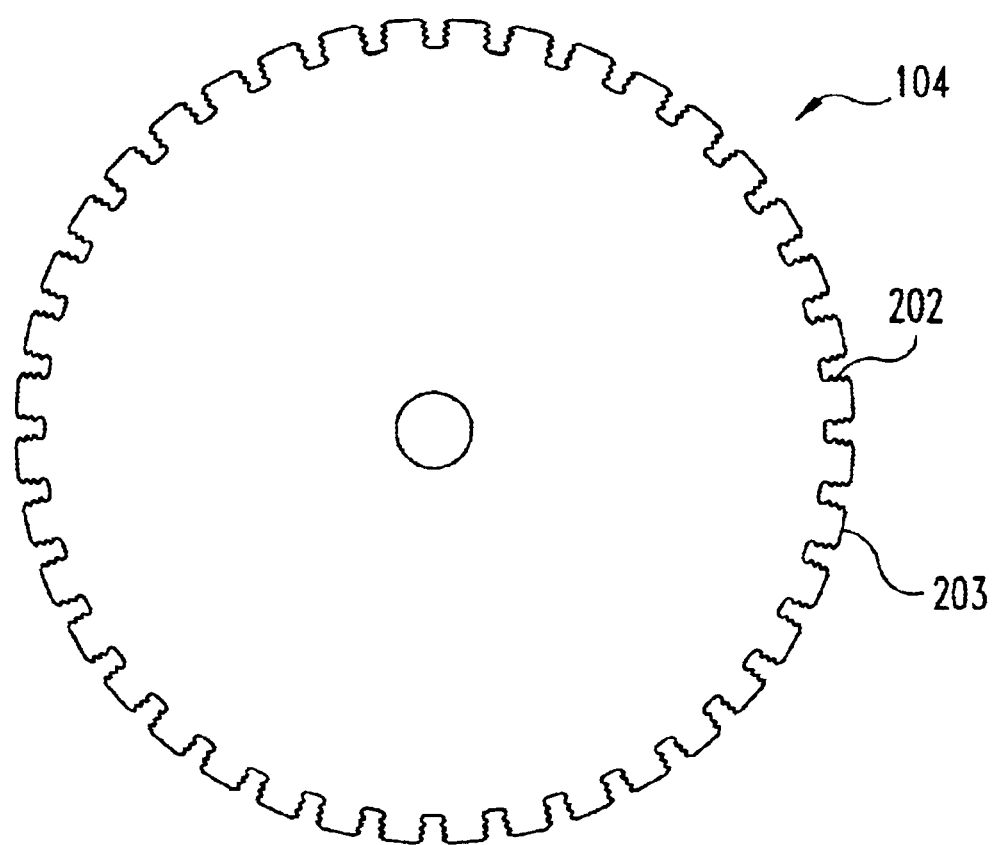
FIG. 2 is a top plan view of a gas turbine engine disk comprising a plurality of blade attachment slots adapted for carrying blades.

With reference to FIG. 2, there is illustrated one form of the disk 104 after the broaching process has formed a plurality of blade attachment slots 202 along perimeter 203. The disk 104 can be formed of a variety of materials having the properties desirable for operation in a gas turbine engine environment. While the present invention will be described in terms of broaching a gas turbine engine disk, the present invention is equally applicable to broaching all types of components and is not limited to gas turbine engine components.

Figure 3:
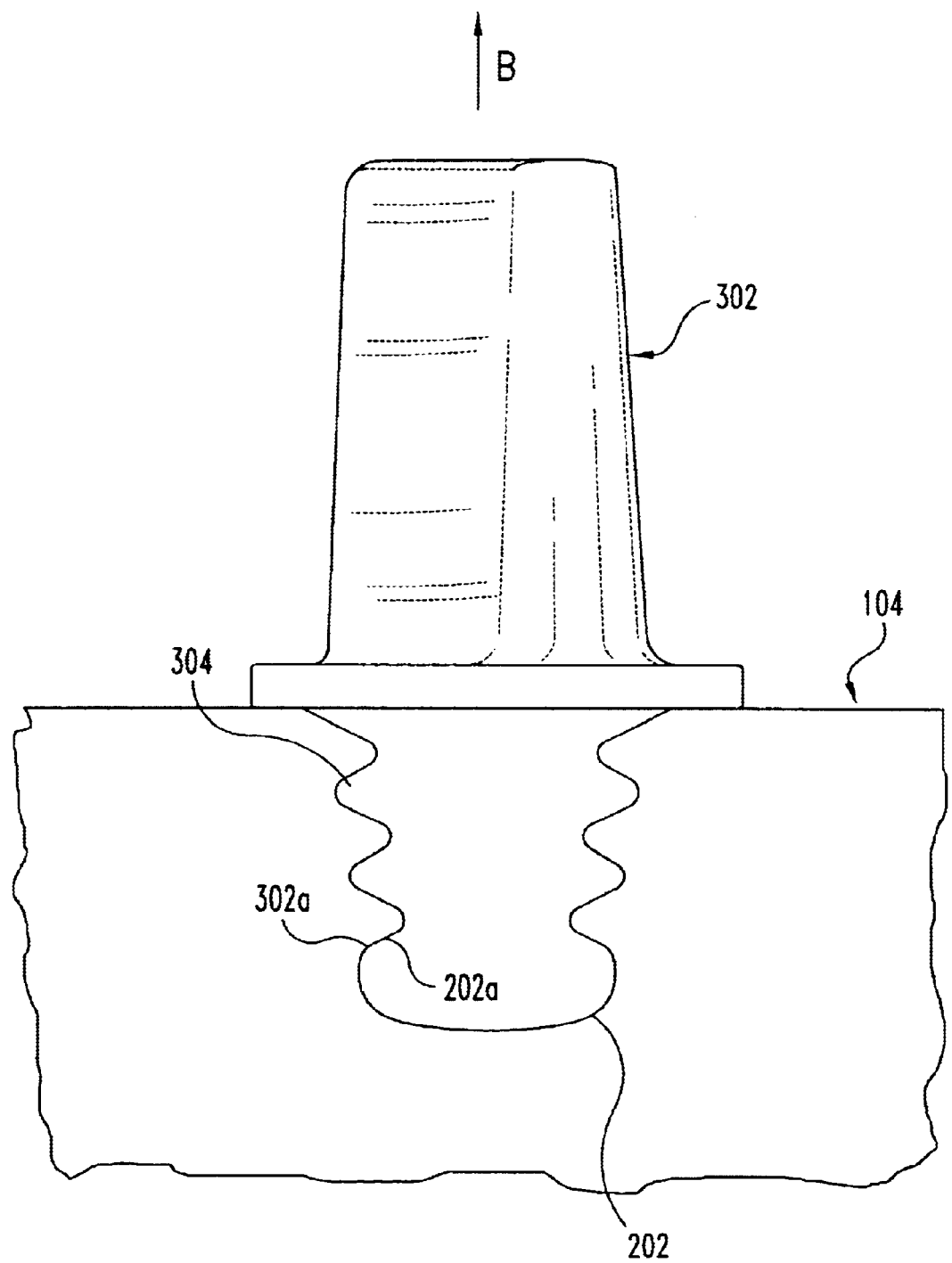
FIG. 3 is an enlarged partial side view of a portion of the gas turbine disk of FIG. 2, with a blade located within one of the blade attachment slots.

Referring to FIG. 3, there is illustrated an enlarged view of a portion of the gas turbine disk 104 with a gas turbine engine blade 302 retained within blade attachment slot 202. A plurality of surfaces formed on the disk defines the blade attachment slot 202 that extends between a first side and second side of the disk. More particularly, gas turbine engine blade 302 includes a root portion 304 disposed within blade attachment slot 202 and adapted to couple the blade to the disk 104. During engine operation, the disk 104 is rotated and a centrifugal force indicated by arrow B is transmitted from the blade 302 to the disk 104. Root portion 304 of gas turbine engine blade 302 and blade attachment slot 202 have a "fir-tree" type configuration, which is generally acknowledged to provide greater resistance to the centrifugal loading associated with rotating components. The centrifugal force associated with rotating blade 302 is transmitted from the pressure surfaces 302a of the blade to a complementary surface 202a of the disk 104. In a preferred form of the present invention the surfaces on the disk 104 are substantially flat. More specifically, pressure surfaces 302a and 202a are substantially flat to prevent point loading between the components. However, it is understood that the root portion 304 and the blade attachment slots 202 can have other geometric shapes as known to one skilled in the art.

Figure 4:
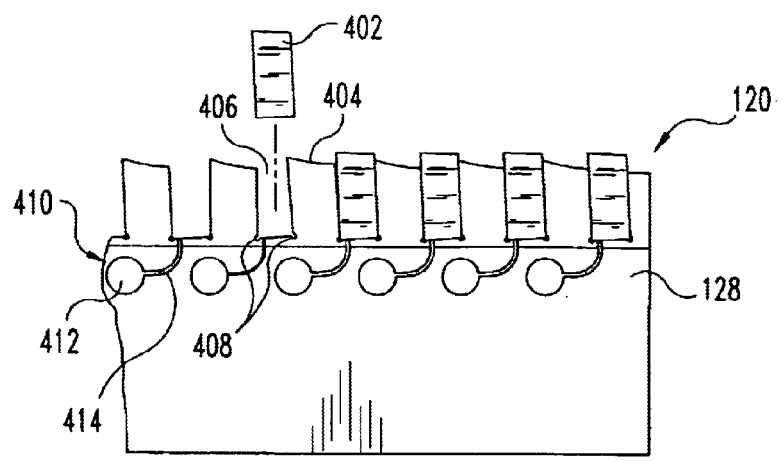
FIG. 4 is an illustrative side elevational view of one embodiment of a broach assembly with removable cutting inserts.

Referring to FIG. 4, there is illustrated a side elevational view of one embodiment of a broach assembly 120 of the present invention. Broach assembly 120 includes a carrier 128 with a plurality of cutting inserts 402 coupled thereto. In one embodiment the carrier 128 includes a mounting system for securely attaching the unit to a support member of a broaching machine. One mounting system includes a plurality of fasteners that pass through a portion of the carrier and engage with threaded openings in the support member. The cutting inserts are preferably formed of a carbide material or a tool steel material and in one form have a coating thereon. The carrier 128 includes a plurality of support members 404 for supporting and securing the cutting inserts 402 within compression mounts 406 between adjacent support members 404. The cutting inserts 402, support members 404 and compression mounts 406 are preferably aligned in a row. In one form of the present invention, the carrier 128 is elongated in a longitudinal direction. It is preferred that the support member 404, support member 406 and cutting inserts are aligned in a row 11 with the longitudinal direction. Further, the support members 404 are preferably integrally formed with the main body member of the carrier 128.

In one form of the present invention the compression mounts 406 include reliefs 408 designed to minimize chipping of the cutting inserts 402. The carrier 128 includes securing mechanisms 410 that allow for the securing of the removable cutting inserts 402. Each securing mechanism 410 includes a tool receiving hole 412 and a relief 414. The relief 414 extends between the tool receiving hole 412 and the compression mount 406 and facilitates the movement of the support members 404 between a closed position and an open position that allows movement of the cutting insert 402 relative to the carrier 128.

Figure 5:
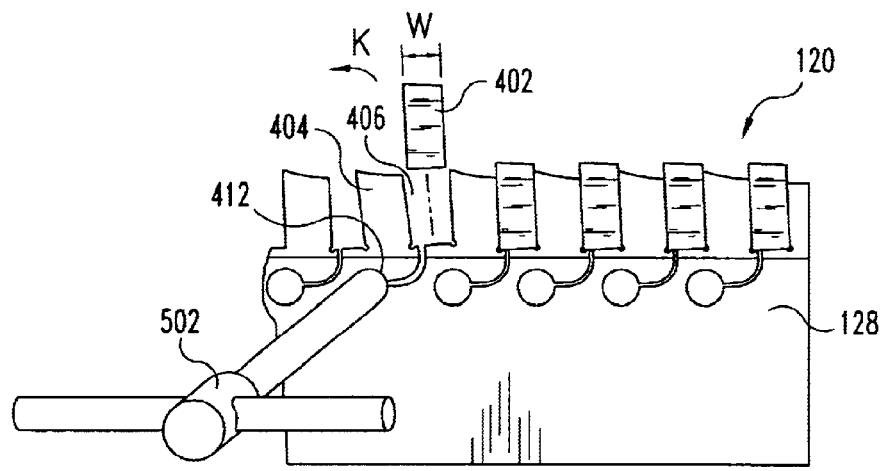
FIG. 5 is an illustrative side elevational view of the broach assembly of FIG. 4 with a compression mount opened to allow the insertion of the removable cutting insert.

Referring to FIG. 5, there is illustrated the broach assembly 120 with one of the compression mounts 406 opened to allow for the insertion of the removable cutting insert 402. Removable cutting insert 402 has a width indicated by arrow W and the compression mount 406 has been opened to a width larger than the width W of the cutting insert 402. In one form, a tool 502 is inserted into the tool-receiving hole 412 and turned to open the compression mount 406. Tool 502 has an asymmetry that is received within the tool-receiving hole 412 and upon rotation the asymmetry causes the respective support member 404 to be displaced in the direction of arrow K. In one embodiment a lobe defines one asymmetry in the tool 502. More particularly, in one form of the present invention the tool 502 is operable to move a portion of the carrier 128 including the respective support member 404 relative to the rest of the carrier unit.

Figure 6:
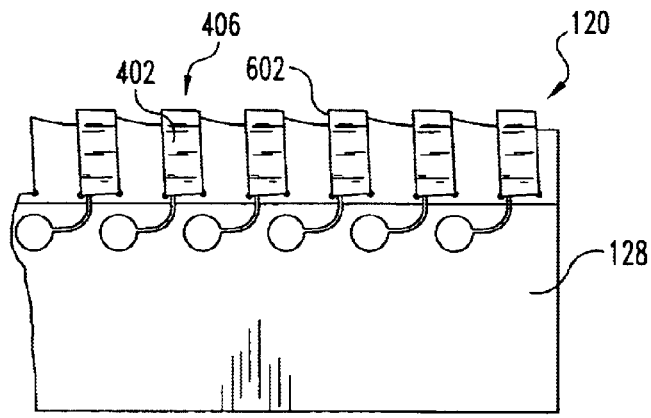
FIG. 6 is an illustrative side elevational view of the broach assembly of FIG. 4 with the removable cutting inserts coupled thereto.

With reference to FIG. 6, there is illustrated the cutting insert 402 received within the compression mount 406. The compression mount 406 is closed to compressively secure the cutting insert 402 to the carrier 128. In the closed position the compression mount 406 creates an interference fit between the cutting insert 402 and the compression mount 406. In one form, the interference fit between the cutting insert 402 and the compression mount 406 is within a range of between 0.001 inches and 0.002 inches. In a preferred form, the interference fit between the cutting insert 402 and the compression mount 406 is about 0.0015 inches. However, other degrees of interference fit are contemplated herein. A cutting surface 602 is formed on the cutting insert 402 and extends above the compression mount 406.

Figure 7:
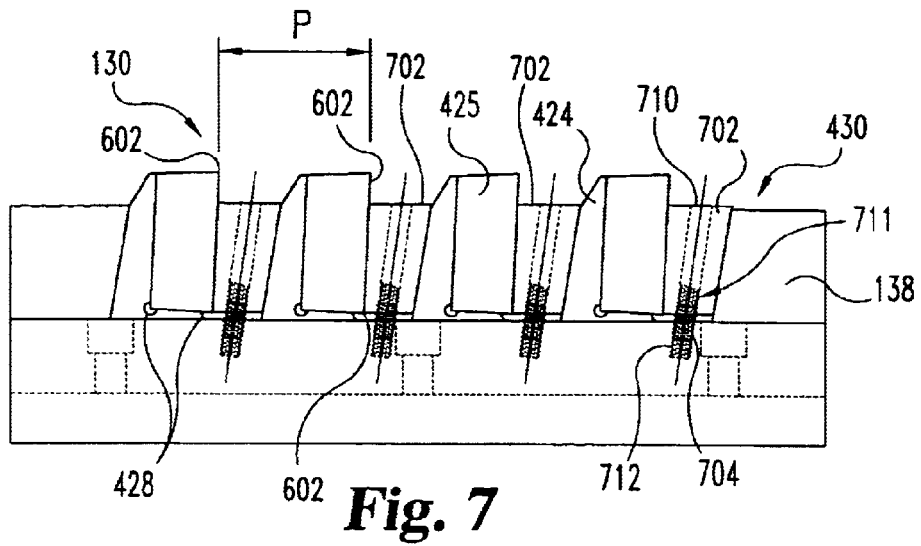
FIG. 7 is an illustrative side elevational view of another embodiment of a broach assembly with removable cutting inserts.

Referring to FIG. 7, there is illustrated a side elevational view of another embodiment of a broach assembly 130 with a carrier 138 and a plurality of removable cutting inserts 425 coupled thereto. The carrier 138 includes a mounting mechanism 430 for securing the removable cutting inserts 425. The mounting mechanism 430 includes a spacer 702 and a coupling member 704. The spacer 702 is located between an adjacent pair of the plurality of spaced support members 424 that are integrally formed with the carrier 138. Spacer 702 abuts one of the support members 424 defining the adjacent pair of support members. In a preferred form, a setscrew defines the coupling member 704 and a wedge member defines the spacer 702. The coupling member 704 passes through an opening 710 in the spacer 702 and is engaged between a portion 711 of the spacer and an internally threaded opening 712 of the carrier 138. In one embodiment of the present invention, the portion 711 of the spacer is threaded, and in another embodiment portion 711 is untreated and the coupling member passes through portion 711 and abuts the spacer. However, the coupling member 704 can include other mechanical fastening devices as generally known by those skilled in the art.

Carrier 138 includes the plurality of spaced integral support members 424 that are preferably aligned in a row and spaced along the carrier 138. Each of the plurality of support members 424 braces the adjacent cutting insert along the substantially entire length of the cutting inserts 425. The carrier 138 includes a plurality of spacers 702 that are aligned in a row. In one embodiment of the present invention the mounting mechanism 430 includes anti-chipping reliefs 428 for minimizing chipping of the cutting inserts 425. However, it should be understood that a mounting mechanism without anti-chipping reliefs is contemplated herein.

In one form of the present invention each cutting insert 425 has a cutting surfaces 602 provided at opposite ends of the cutting insert 425. Therefore when one cutting surface 602 becomes worn or damaged the cutting insert 425 can be inverted to provide another sharp cutting surface 602 for the broaching process. The cutting inserts utilized with the present invention are not limited to those with two cutting surfaces unless provided to the contrary and the present invention contemplates a cutting insert 425 having only a single cutting surface. The cutting insert 425 is disposed between one of the pair of adjacent spaced support members 424 and the spacer 702. Upon the securing of the spacer 702 to the carrier body 138 the cutting insert 425 is wedged securely in place. In one form of the present invention the wedging places the cutting insert 425 in an interference fit.

It is preferred during the broaching process that at least two cutting inserts are in contact at the same time with the workpiece. However, the number of cutting inserts in contact with the workpiece will be generally determined by the particular parameters defined by a processing engineer. Therefore, it is necessary to use a broach with the appropriate pitch for a particular type and thickness of material. The term "pitch" as referred to herein (unless noted otherwise) indicates the distance between the cutting surfaces 602 of adjacent cutting inserts of the broach. With reference to FIG. 7, the arrow P indicates the pitch. One form of the present invention contemplates a modular broach system wherein broach carriers having different pitch settings are coupled to the bolster to change the pitch of the broach.

Figure 8:
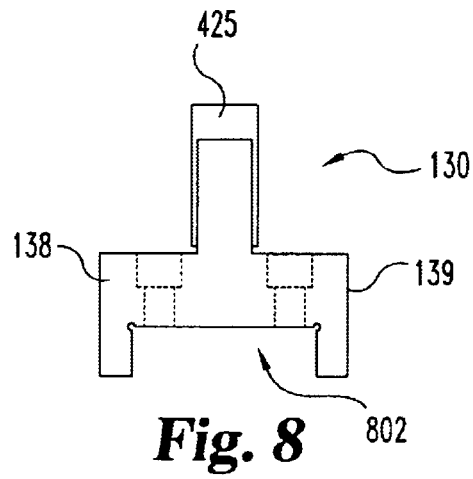
FIG. 8 is an illustrative end view of the broach assembly of FIG. 7.

With reference to FIG. 8, there is illustrated an end view of carrier 138. The body 139 of the carrier 138 includes a cavity 802 that is configured to nest on and/or fit over a support member that is adapted to carry the broach assembly 130. However, it is understood herein that the present invention contemplates an alternate embodiment wherein the carrier does not include a cavity for nesting on the support member and instead the carrier body would abut the support member. The carrier is applicable for mounting on a variety of supports and is also adapted to be received on a quick-change tool carrier of the present invention. The quick-change tool carrier is described below and in one form is adapted for use with a milling machine being operated as a broaching machine.

Figure 9:
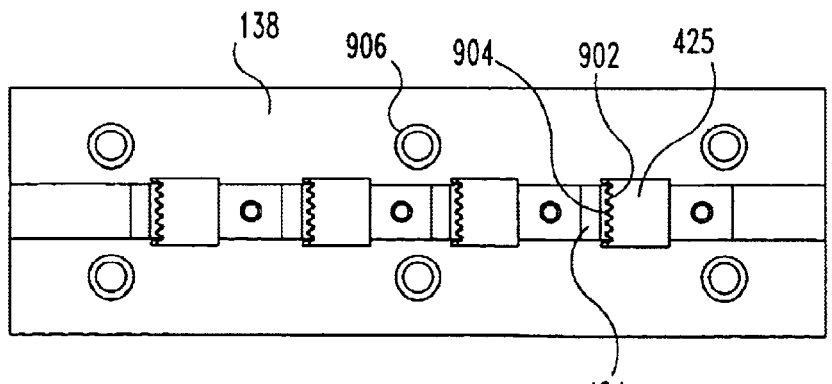
FIG. 9 is an illustrative top view of the broach assembly of FIG. 7.

With reference to FIG. 9, there is illustrated a top plan view of the carrier 138 which includes the cutting inserts 425 with a lateral support surface 902 that is designed to minimize lateral movement of the cutting inserts 425 during the broaching operation. Lateral support surface 902 is formed on the cutting insert 425 and engages a corresponding lateral support surface 904 formed on the support member 424. In one form the lateral support surfaces 902 and 904 have a plurality of grooves formed therein to increase the surface area for engagement between the cutting insert 425 and the support member 424. The lateral support surfaces 902 and 904 are preferably defined by serrated or ridged surfaces. One embodiment of the serrated or ridged surfaces includes a v-shaped profile. In one form the lateral support surfaces 902 and 904 extend for substantially the full length of the cutting insert 425 and the support member 424. In an alternate embodiment the lateral support surfaces 902 and 904 extend along only a portion of the full length of the cutting insert 425 and the support member 425. Carrier 138 preferably includes a plurality of spaced securing holes 906 that are adapted to be used in securing the carrier to the support member of the broaching machine with a plurality of fasteners. The carrier 138 is preferably substantially elongated in a longitudinal direction. Further, the plurality of integral support members 424, the plurality of spacers 702 and the plurality of cutting inserts 425 are preferably oriented substantially parallel with the longitudinal direction.

Figure 10:
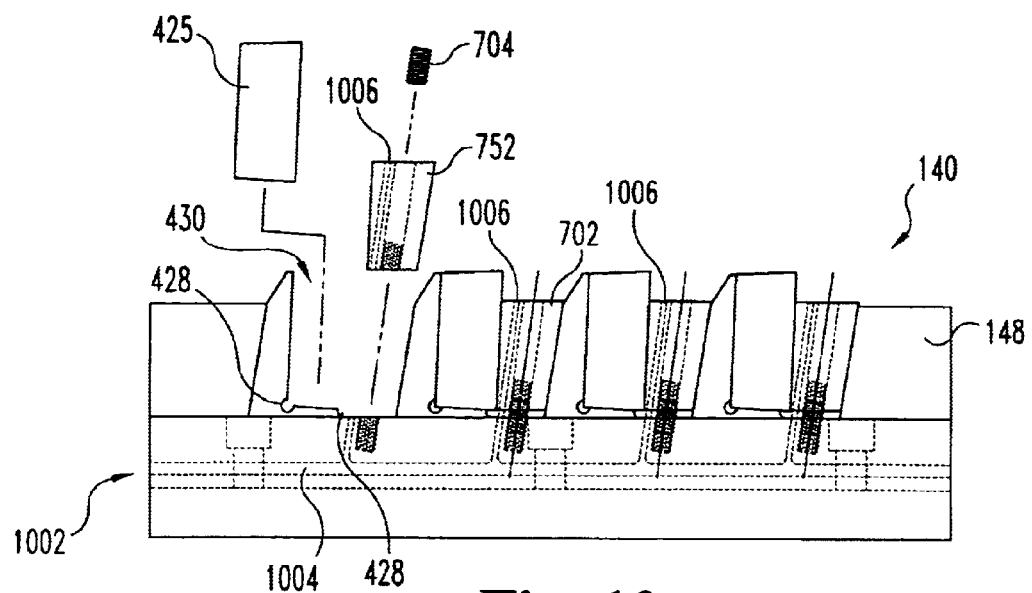
FIG. 10 is a partially exploded view of an alternate embodiment of the broach assembly of the present invention.

With reference to FIG. 10, there is illustrated a partially exploded view of another embodiment of a broach assembly 140. The broach assembly 140 is substantially similar to broach assembly 130 and further includes an internal fluid flow structure 1002 within the carrier 148 for passing a lubricant and/or cooling fluid within the broach assembly 140. The internal fluid flow structure 1002 includes a first passageway 1004 in the carrier 148 and a second passageway 1006 in the spacer 752 that are disposed in flow communication. Second passageway 1006 is preferably a hole defined in the spacer 752. The internal fluid flow structure 1002 is placed in fluid communication with a fluid supply 113 (FIG. 1) and the fluid is controllably discharged from the second passageway 1006 onto the workpiece and the cutting inserts 425 during the broaching operation. In a preferred form the fluid is a high-pressure lubricant, and in one embodiment has a pressure within the internal fluid flow structure 1002 of around 1000 psi. While the internal fluid flow structure was described with reference to broach assembly 140 it is understood that the system is contemplated for use in other broach assemblies of the present invention.

Figure 11:
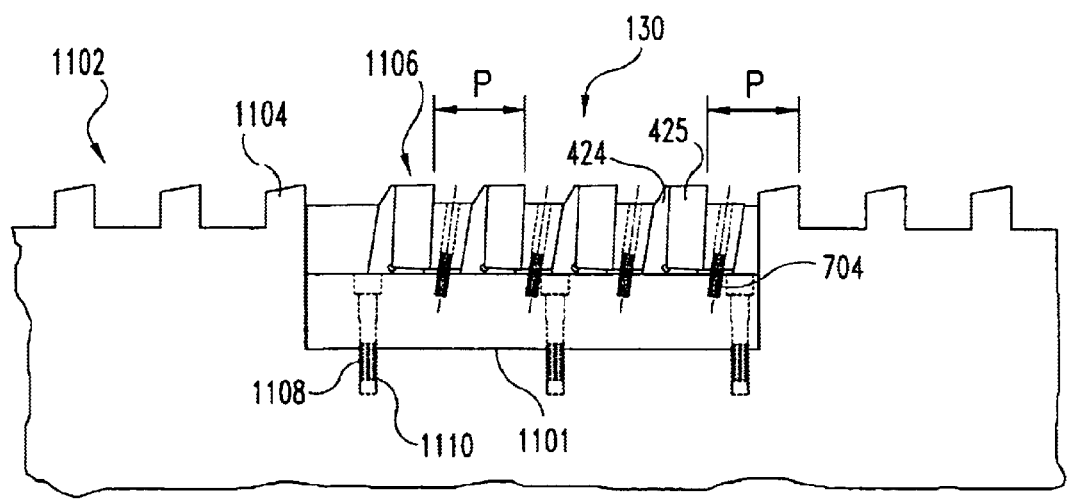
FIG. 11 illustrates the attachment of the broach assembly of FIG. 7 to a unitary broach bar in order to replace a section of the broach bar.

With reference to FIG. 11, there is illustrated the replacement of a section 1101 of a unitary broach bar 1102 with a broach assembly 130. More particularly, the present invention contemplates reworking the broach bar 1102 by the fabrication and/or replacement and/or repair of the unitary broach with one or a plurality of broach assemblies. While the present invention will be described with reference to broach assembly 130 it is understood that other broach assemblies can also be utilized in the process. The section 1101 had damaged and/or worn cutting teeth 1104 that were removed from the unitary broach bar 1102 to define a predetermined opening 1106 free of integrally formed teeth 1104 and configured to receive the broach assembly 130. In forming the predetermined opening 1106 it is desired that the predetermined opening be sized to an integer multiple of the length of the broach assembly to be installed. Broach assembly 130 is positioned within the predetermined opening 1106 and coupled to the unitary broach bar 1102 with coupling members 1108. In a preferred form the coupling members 1108 are defined by threaded fasteners that engage internally threaded openings 1110 formed in the broach bar 1102. However, the present invention contemplates all types of screws and other mechanical manners to be used as the coupling members 1608 as are believed known to one of ordinary skill in the art. Broach assembly 130 is attached to the unitary broach bar so that the pitch P between the integrally formed cutting teeth 1104 and the cutting inserts 425 remains constant. Further, in an alternate embodiment the entire quantity of integral cutting teeth 1104 are removed from the unitary broaching bar and replaced by broach assemblies that are attached to the bar. The removal of all or a portion of the integral cutting teeth from the unitary broach bar can be done with grinding, EDM processes and/or other mechanical machining processes generally utilized to remove material.

In another form of the present invention there is contemplated a process for reworking a unitary broach bar having a plurality of broach assemblies. More specifically, the broach bar has been previously reworked and includes at least one broach assembly mechanically coupled thereto. The at least one broach assembly is removed from the broach bar and a second broach assembly is installed on the broach bar. Preferably the removal of the at least one broach assembly involves the unscrewing of the plurality of fasteners engaging the broach bar. In another form of the present invention wherein all of the integral cutting teeth have been removed and replaced with broach assemblies, the first broach assemblies are removed from the broach bar and replaced with second broach assemblies.

A method of forming the blade attachment slots 202 in the disk 104 will now be described. While the method will be described with reference to forming openings in a gas turbine engine disk it is understood that the method is generally applicable to forming a wide variety of slots, reliefs and all types of openings in a variety of components. Although the method described herein relates to forming blade attachment slots 202 in the disk 104, it is contemplated that the present invention can be used to form slots and holes with different profiles than the slots shown in the drawings. For example, the blade attachment slots 202 could be formed at an angle on the turbine disk 104. Methods of the present invention contemplate using either a single broaching stage or multiple broaching stages to form the blade attachment slot 202. Following the single broaching stage or multiple broaching stages, the blade attachment slot 202 is finished by using a substantially full-form finish honing process. The finish honing process produces substantially smooth and flat surfaces that define the attachment slot 202 and substantially eliminates the presence of broach rippling thereon. The broach used in the broaching process can be a unitary broach or an insert-type broach as described above.

Figure 12:
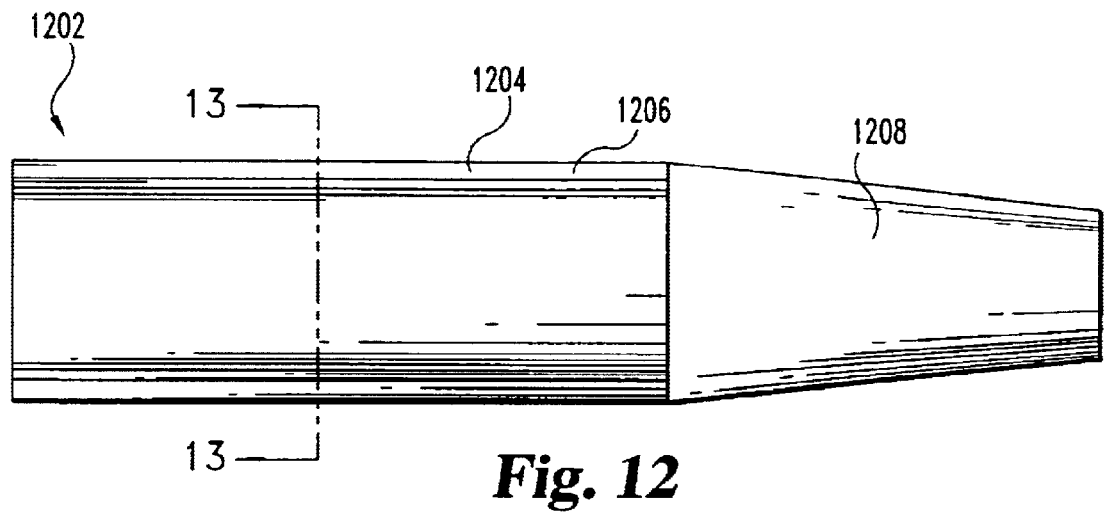
FIG. 12 is an illustrative view of a substantially full-form hone.

Referring to FIG. 12, there is illustrated one type of hone 1202 that can be used in the honing stage. The hone 1202 preferably defines a broach hone. The hone 1202 has a full form-honing surface 1204 including a non-tapered portion 1206 and a tapered portion 1208. The tapered portion 1208 is the first portion of the hone that contacts the surface of the disk defining the blade attachment slots. Honing surface 1204 of the non-tapered portion 1206 defines a full form hone that coincides with the finished profile desired for the blade attachment slot 202.

Figure 13:
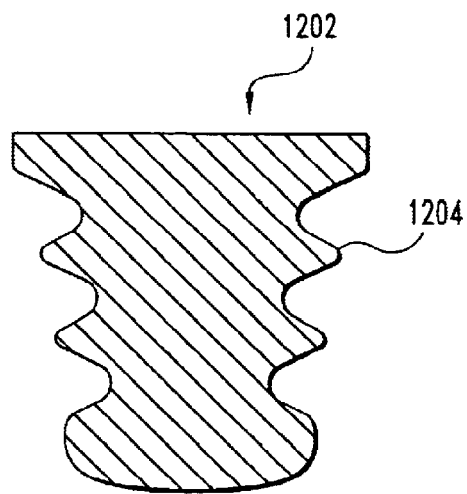
FIG. 13 is a cross sectional view of the full-form hone of FIG. 12 taken along line 13—13.

With reference to FIG. 13, there is illustrated a cross sectional view of the hone 1202 taken along line 13—13 of FIG. 12. The honing surface 1204 is designed to match the desired contour of the finished blade attachment slot 202. It should be understood that depending upon the application the honing surface profile could vary from that illustrated in FIG. 13. In a preferred form, the hone 1202 is a diamond hone, however other materials, such as but not limited to cubic boron nitride are contemplated herein. In an alternate embodiment it is contemplated that the honing operation is performed with contour shaped hones that have honing surfaces which are supported between opposing walls of the disk but do not always coincide with the entire contour of finished opening. More particularly, in one alternate embodiment there are a series of hones that are used to define the finished contour of the opening. However, it should be understood that in a preferred form of the present invention the full form-honing surface is designed to coincide with the desired finished contour of the blade attachment slot in order to provide more consistent finished contours.

Figure 14:
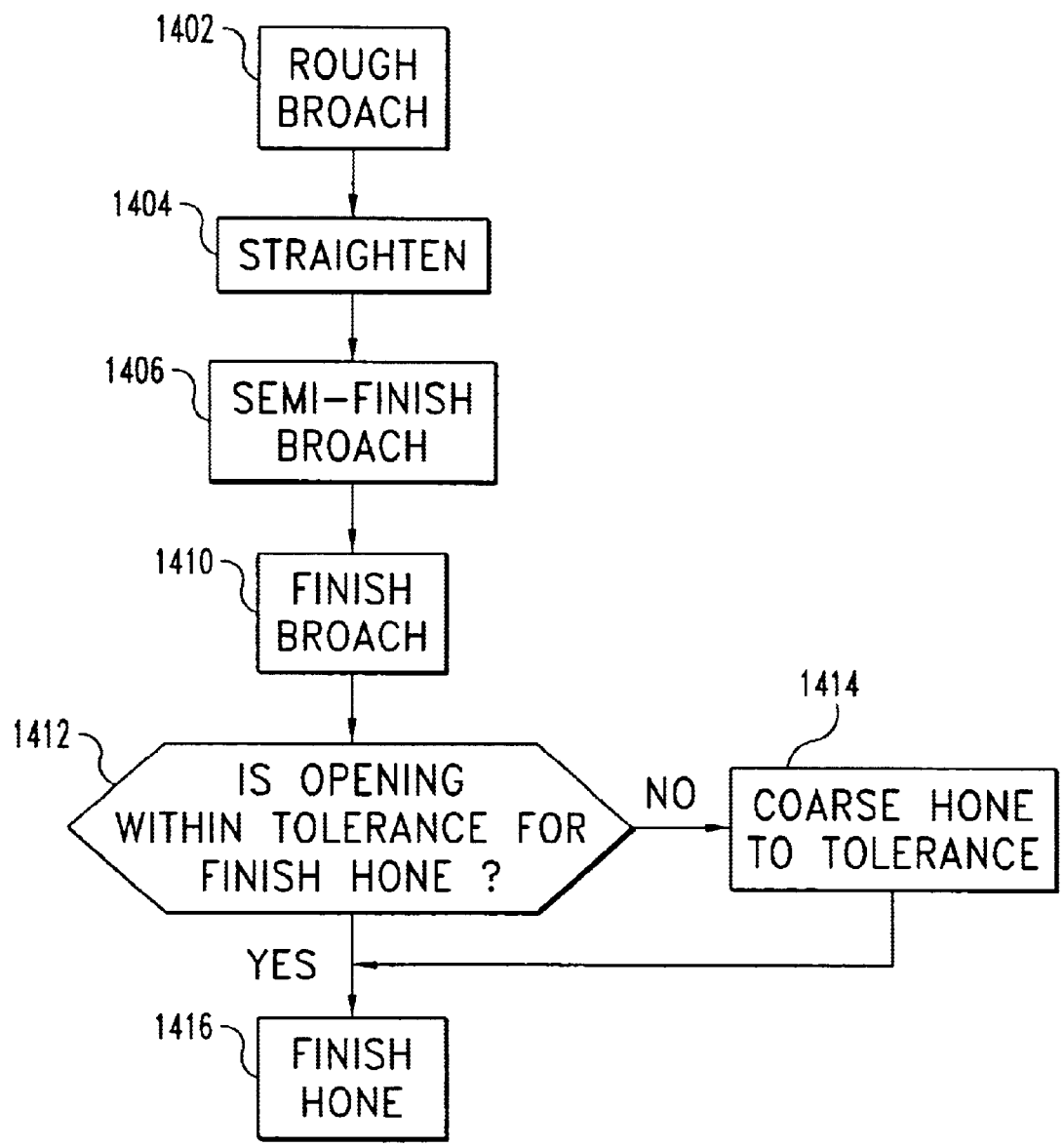
FIG. 14 is a flow chart illustrating one method for forming an opening in a workpiece.

Referring to FIG. 14, there is set forth a flow chart illustrating the acts of one method for forming an opening in a workpiece. In a preferred form, this process can be used to form blade attachment slots 202 in disks 104. Although the process is described with reference to blade attachment slots 202, it is contemplated that this process can be used to form other types of openings in disks and other types of workpieces. Initially, in stage 1402 a rough broach operation is used to form an initial rough opening in the disk 104. In one embodiment of the present invention the disk 104 is warped during the rough broaching operation of stage 1402 and is subsequently straightened in stage 1404 to remove this warpage. In stage 1406, a semi-finish broaching operation is used to form a semi-finished opening in the disk 104. In a preferred form of the present invention, the semi-finish broaching operation of stage 1406 removes material from the disk 104 to within about 0.0100 inches of the finished profile for the blade attachment slot 202. In stage

1410, a finish broaching operation 1410 removes a relatively small depth of material from the semi-finish opening to obtain a finish broach opening. In the preferred form of the present invention, the finish broaching operation removes material from the disk 104 to within about 0.0015 of an inch of the finished profile of the blade attachment slot 202. In a preferred embodiment of the present invention the rough broach and the semi-finish broach operation are combined into one broaching stage and thereafter the disk 104 is straightened to remove any warpage. The combination of the rough broach and the semi-finish broach operation provide a substantial saving in broaching machine time.

In stage 1412, the disk is inspected to determine whether the finish broach opening formed during the finish broaching operation is within a predetermined tolerance appropriate for finish honing. In the preferred form, the predetermined tolerance for finish honing is within about 0.0015 of an inch of the desired finished profile of the blade attachment slot 202. If the opening is within the tolerance, then finish honing is performed in stage 1416 to create the finished profile for the blade attachment slot 202. The finish honing act of stage 1416 removes additional material from the disk to create the final form that is substantially free of broach ripples that are commonly created during the previous broaching stages. However, if the inspection of stage 1412 yields that the final broach opening is not within the predetermined tolerance, a coarse hone in stage 1414 is used to hone the finish broach opening to within the predetermined tolerance prior to the finish honing stage 1416. In one embodiment the finish honing stage 1416 does not significantly warp the disk 104, and thus the disk 104 does not have to undergo a straightening act after the finish honing stage 1416. However, in an alternate embodiment the disk 104 is subjected to a straightening act after the finish honing stage.

Figure 15:
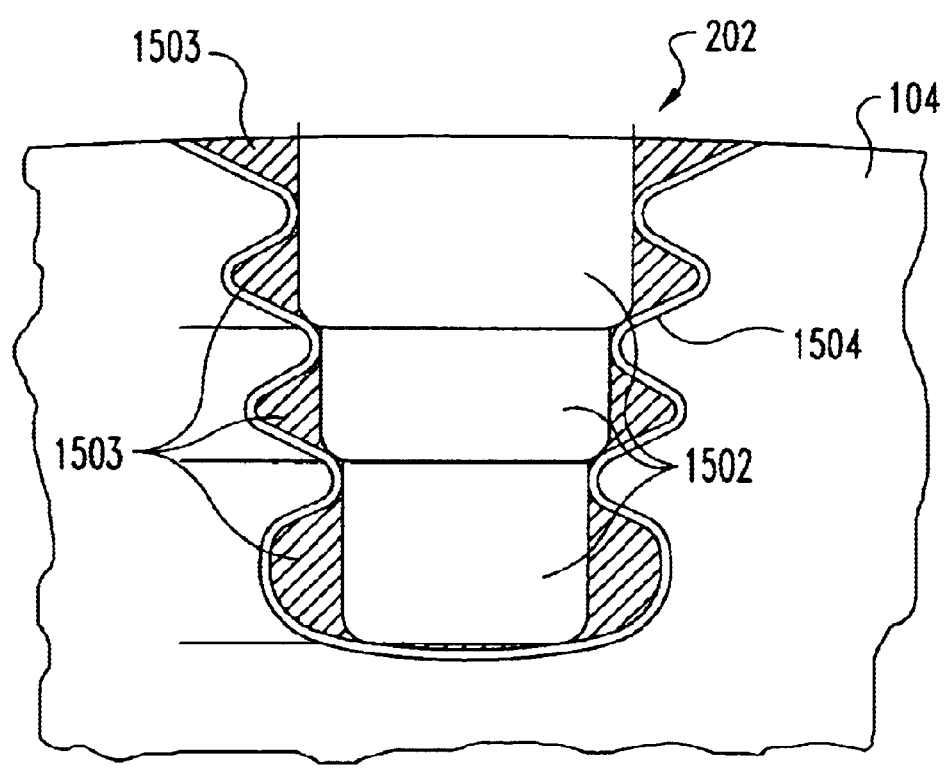
FIG. 15 illustrates forming a blade attachment slot according to one embodiment of the present invention.
Figure 16A:
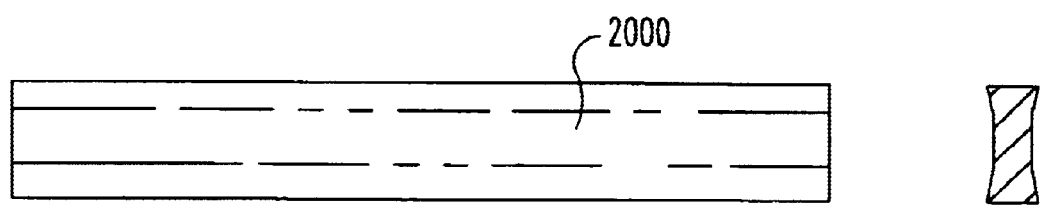
FIG. 16a illustrates a material from which cutting inserts are manufactured by an electro-discharge machining operation.
Figure 16B:
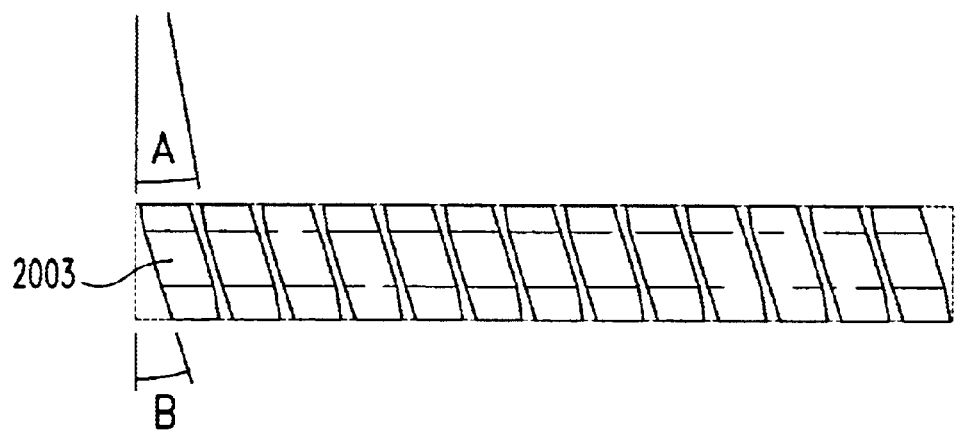
Figure 16C:
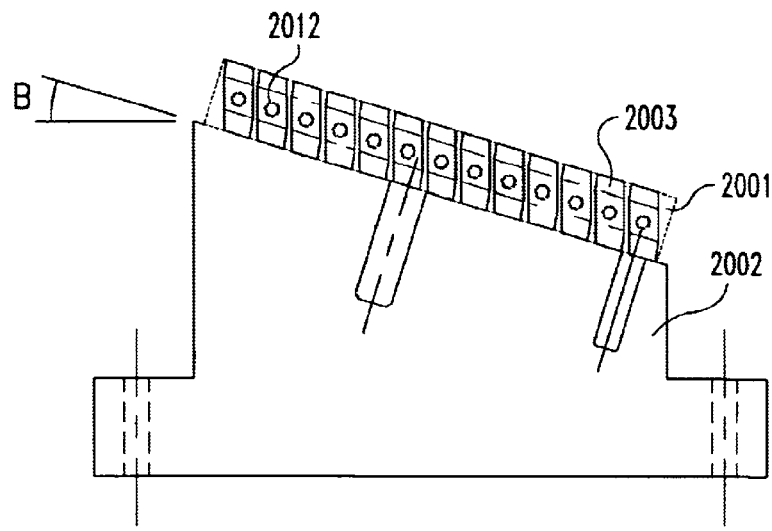
FIG. 16c illustrates a side elevational view of one embodiment of a fixture utilized in the manufacture of the cutting inserts of FIG. 16b.
Figure 16D:
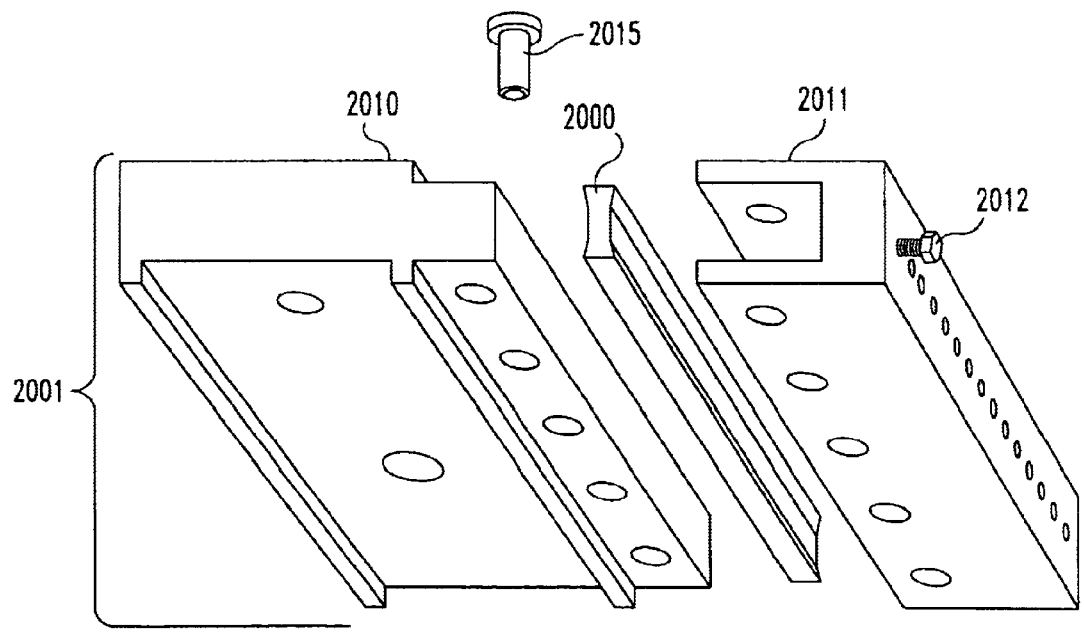
FIG. 16d illustrates one embodiment of a fixture utilized in the manufacture of the cutting inserts of FIG. 16b.

With reference to FIG. 15, there is illustrated one sequence of the broaching paths for forming blade attachment slots 202 in the disk 104. Area 1502 illustrates the relative amount of material removed from the disk 104 during the rough broaching stage 1402. Area 1503 illustrates the relative amount of material removed during the semi-finish broach stage 1406 and the finishing broach stage 1410, and if necessary based upon the decision in stage 1412 the amount of material removed during the coarse honing stage 1414. Area 1504 illustrates the relative amount of material removed from the disk 104 during the finish honing stage 1416. In the preferred form of the present invention the broaches utilized in stages 1406 and 1410 are of a two-sided type that is loaded between the opposing walls of the disk defining the attachment slot. In an alternate form of the present invention the material removed by the rough broach stage and the semi-finish broach stage are accomplished in a single stage.

FIGS. 16a–16d illustrate a method and apparatus utilized for making the cutting inserts by an electrical discharge machining (EDM) operation. Typically, a grinding operation has been utilized to form the cutting surfaces for the cutting teeth of broaches. The formation of the cutting surface by grinding can leave a relatively rough cutting surface and create microchips within the cutting surface. These microchips in the surface can propagate and create premature failure of a cutting tool. In one embodiment of the present invention the cutting inserts are formed with an EDM process.

An insert bar 2000 is put into an orientation fixture 2001 and thereafter the EDM process is run to produce the individual cutting tool inserts 2003. In a preferred form of the present invention the insert bar is preground. Orientation fixture 2001 captures the bar 2000 between a first member 2010 and a second member 2011 that are held together by a plurality of fasteners or pins 2015. A plurality of fasteners 2012 is coupled to first member 2010 and is adjusted to engage the surface of bar 2000. Each of the plurality of fasteners 2012 is located adjacent the bar 2000 and designed to hold an individual cutting insert 2003 as it is machined from the stock of material. Only one fixture 2002 for cutting the angles on the cutting tool inserts is illustrated for receiving the orientation fixture 2001 thereon. Fixture 2002 is designed to fixture the preground insert bar 2000 at the first angle B during the cutting of angle B. A second fixture (not illustrated) of similar design to fixture 2002 is designed to receive the orientation fixture 2001 and hold at the second angle A as the next series of cuts is made in the material. In another form of the present invention an adjustable fixture is contemplated for holding the orientation fixture as the bar is cut. The individual cutting inserts 2003 are captured to the fixture 2001 by the plurality of fasteners during the EDM process. The preferred method allows for the formation of a plurality of individual cutting inserts from a single insert bar. However, it is understood that the present inventions are applicable to use with a variety of cutting inserts that are formed by a multitude of techniques.

Ion beam treatment can also be used to produce enhanced cutting surfaces for the cutting inserts. In U.S. Pat. No. 5,473,165 to Stinnett et al., which is hereby incorporated by reference, there is disclosed a method and apparatus for altering material with an ion beam treatment. Thermally treating materials with a repetitively pulsed high-energy ion beam can create desirable surface properties without affecting the remainder of the material. In one form of the present invention the cutting insert 2003 is treated with repetitively pulsed ion beams and a melt layer forms on the cutting surface of the cutting insert. The remainder of the cutting insert 2003 rapidly quenches the melt layer, which improves the surface hardness of the cutting insert 2003 without making the overall cutting insert 2003 brittle.

Figure 17:
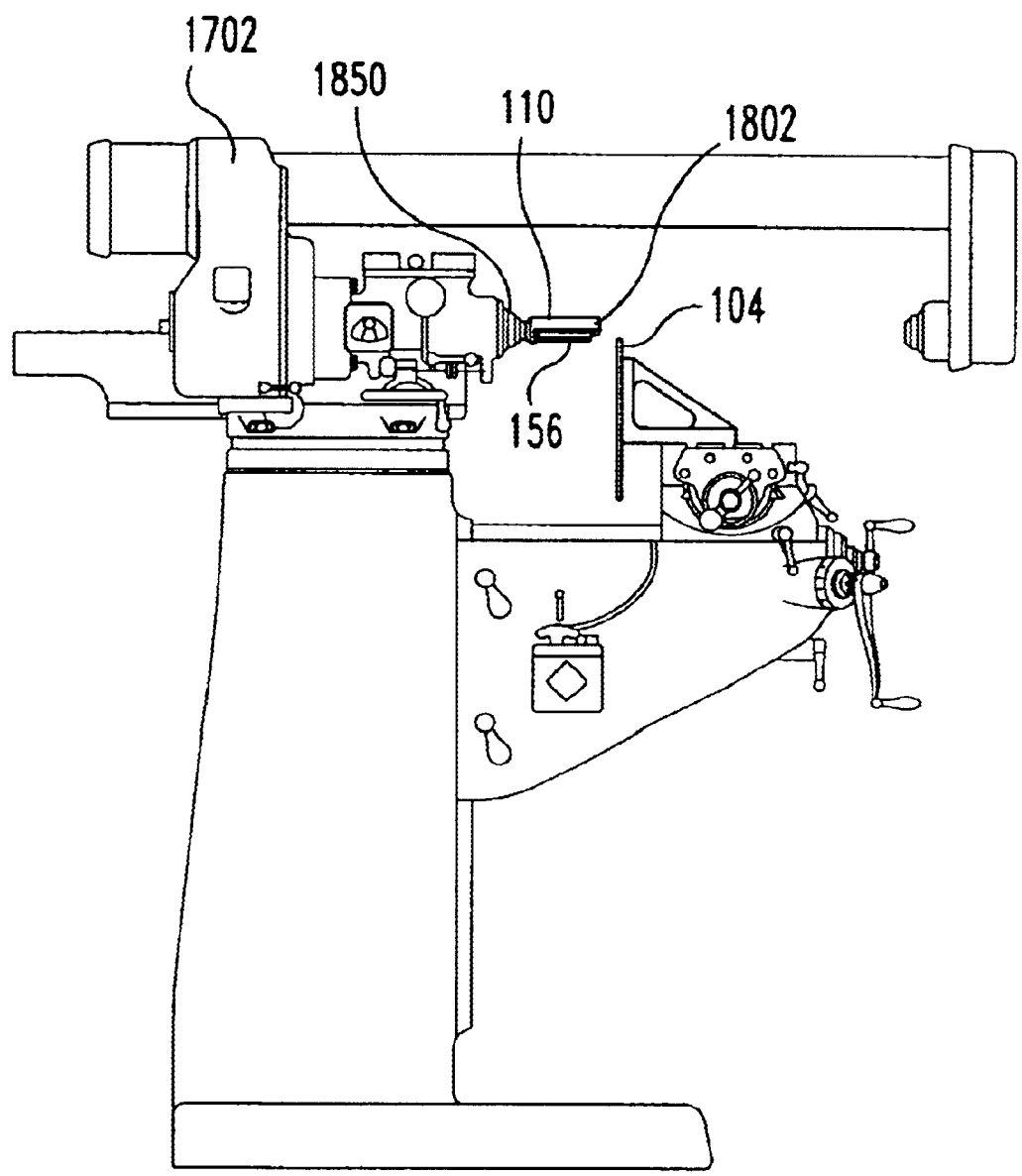
FIG. 17 illustrates one embodiment of a milling machine being utilized as a broaching machine.
Figure 18:
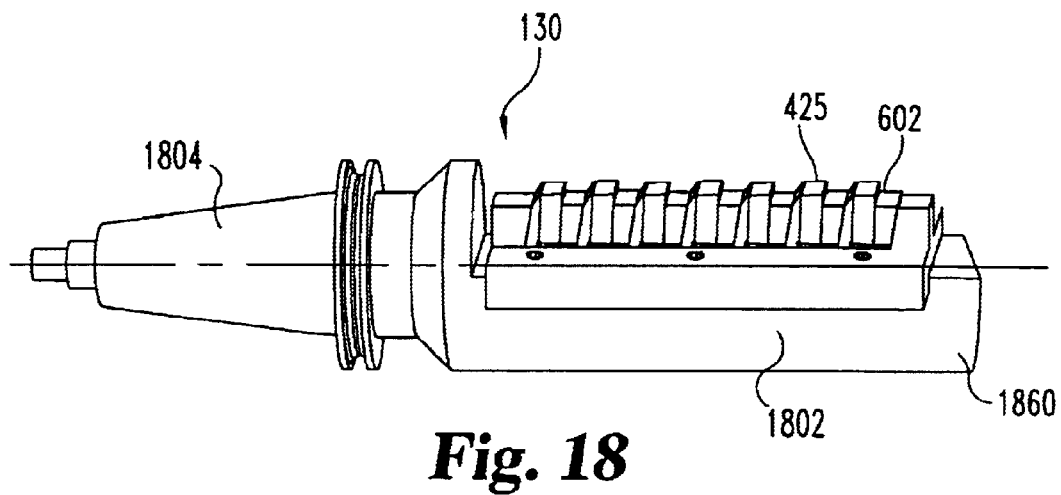
FIG. 18 illustrates one embodiment of a tool carrier adapted to be received within the milling machine of FIG. 17.

With reference to FIGS. 17 and 18 there is illustrated a milling machine 1702 that is utilized as a broaching machine. In a preferred form the milling machine 1702 is integrated with a tool changer that automatically change tools so that the broach-honing process, as described above, can be performed on a single milling machine 1702. The broach assembly 130 is secured to a quick-change tool carrier 1802. The quick-change tool carrier 1802 has an attachment member 1804, which is designed and constructed to fit within the quill 1850 of the milling machine 1702. The feed of the milling machine is operated to drive the broach into machining contact with a portion of the disk 104. Further, in one form of the present invention there is a tool changer that facilitates the rapid switching between broaches that are carried on the quick-change tool carrier 1802.

In one form of the present invention the quick-change tool carrier 1802 includes the attachment member 1804 and an integrated support member 1860. The support member 1860 is configured to receive a broach assembly. The present invention will be described with reference to a single broach assembly 130 being coupled to the support member 1860 by a plurality of fasteners. However it is understood that a multitude of broach assemblies could be fastened to the support member 1860. Support member 1860 has a substantially stout structure that is designed to minimize deflection and vibration during the broaching process. The quick-change tool carrier 1802 is moved relative to the workpiece as the individual cutting surfaces 602 engage the disk and cut the desired profile.

In one form of the present invention a milling machine is utilized to drive the broach that forms the blade attachment slots in the disk 104. In one embodiment a quick-change tool carrier 1802 including a broach assembly with the desired cutting inserts is loaded into the milling machine 1702. The milling machine 1702 is operated to perform the broaching operation on the disk 104. It is understood that the broaching operation can utilize one or a plurality of broaching stages including one or a plurality of broach assemblies to remove the material from the disk. If another broaching stage is desired a quick-change tool carrier with a broach assembly including cutting inserts of different cutting profiles is placed in the milling machine and the milling machine is operated to continue the broaching operation. The process will be continued until all stages of the desired broaching operation have been completed. In another stage in the process a tool carrier holding a full form hone is placed into the milling machine and utilized to provide a full form honing of the opening in the disk. The honing performed by the hone can be a coarse hone, a finish hone, or a combination of both.

Figure 19:
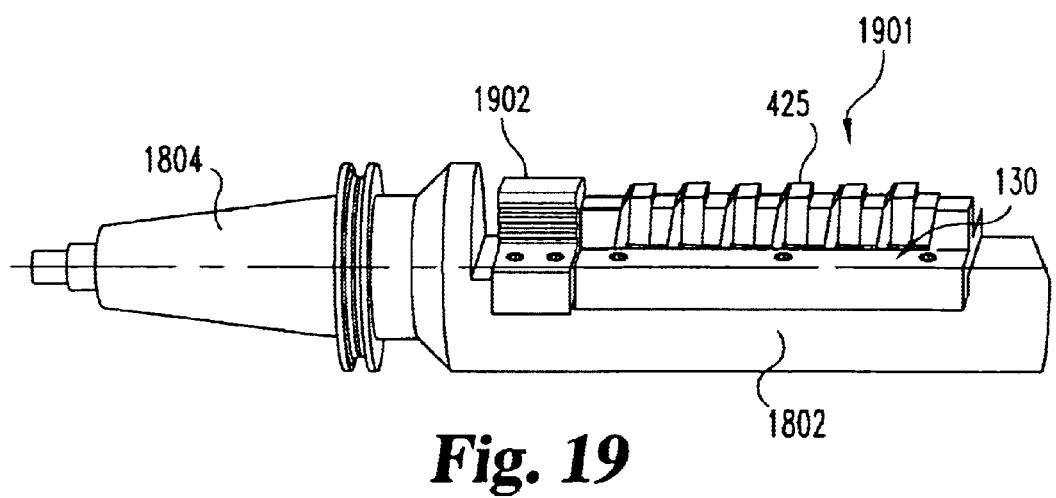
FIG. 19 illustrates another embodiment of a tool carrier adapted to be received within the milling machine of FIG. 17 and which comprises a broaching assembly and a full-form hone.

With reference to FIG. 19, there is illustrated a quick-change tool carrier 1802 that is carrying a broach 1901 and a hone 1902. The quick-change tool carrier 1802 with a broach and hone enable the broaching and honing of the workpiece with a single stroke of the broaching machine. Broaching portion 1901 includes a plurality of cutting inserts 425 and the honing portion 1902 includes at least one substantially full-form hone for utilization in honing the opening. In operation the broach portion 1901 initially engages and broaches an opening in the disk and the hone 1902 subsequently engages the disk material and removes material to finish the opening.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined only by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A broach assembly, comprising:
   a carrier body having a plurality of integral support members aligned in a row and spaced along said carrier body;
   a plurality of spacers aligned in said row and coupled to said carrier body, one of said plurality of spacers being located between an adjacent pair of said plurality of support members, said pair of said plurality of support members defining a first support member and a second support member, and said one of said plurality of spacers abutting said first support member;
   a cutting insert disposed between said second support member and said one of said plurality of spacers, said cutting insert being wedged between said one of said plurality of spacers and said second support member, and wherein said second support member braces a substantial length of said cutting insert during broaching; and
   wherein said plurality of support members and said plurality of spacers and said cutting insert are aligned in said row which extends in the direction of travel for cutting.

2. The broach assembly of claim 1, wherein each of said plurality of spacers defines a wedge member.

3. The broach assembly of claim 1, wherein said cutting insert has a lateral support surface which contacts said support member and said lateral support surface has a contour which minimizes lateral movement of said cutting insert.

4. The broach assembly of claim 1, wherein said carrier body has a first portion with said integral support members extending therefrom and a second portion with a cavity defined therein that is adapted to nest over a support member of a broaching machine.

5. The broaching assembly of claim 1, wherein said carrier body is elongated in a longitudinal direction, and wherein said plurality of integral support members and said plurality of spacers and said cutting insert are oriented substantially parallel with said longitudinal direction.

6. The broach assembly of claim 1, wherein said carrier body includes a first internal fluid flow passageway in fluid communication with a second fluid flow passageway defined in said one of said plurality of spacers and adapted to deliver a fluid through said one of said plurality of spacers to the cutting insert during the broaching operation.

7. The broaching assembly of claim 6, wherein said second fluid flow passageway is defined by a hole extending through said one of said plurality of spacers.

8. The broach assembly of claim 1, wherein said cutting insert is disposed in an interference fit between said second support member and said one of said plurality of spacers.

9. The broach assembly of claim 8, wherein said cutting insert has a first end and a second end, and wherein each of said first ends and said second ends have a cutting edge formed thereon.

10. The broach assembly of claim 1, which further includes quick change tool means for coupling the broach assembly to a broaching machine, and wherein said carrier body is coupled to said quick change tool means and said broaching machine is defined by a milling machine.

11. The broach assembly of claim 1, wherein said cutting insert includes a first end portion and a second end portion, and wherein said second support member braces along said cutting insert to one of said end portions.

12. The broach assembly of claim 11, wherein said second support members includes anti-chipping mechanisms located proximate one of said end portions.

13. The broach assembly of claim 1, wherein said plurality of spacers, said plurality of support members and said cutting insert are in registry.

14. A broach, comprising:
a broach bar having a first portion including a plurality of integrally formed cutting teeth and a second receiver portion defining a section free of integrally formed cutting teeth; and
at least one broach assembly having a plurality of removeable cutting inserts mechanically coupled thereto, said at least one broach assembly coupled to said broach bar in said second receiver portion.

15. The broach of claim 14, wherein said second receiver portion is positioned between a first portion of integrally formed cutting teeth and a second portion of integrally formed cutting teeth.

16. The broach of claim 14, wherein said second receiver portion has been formed on said broach bar by removing a quantity of integrally formed cutting teeth.

17. The broach of claim 14, wherein said at least one broach assembly is coupled to said broach bar by a plurality of fasteners.

18. The broach of claim 14, wherein said broach assembly includes a body member having a plurality of spaced compression mounts formed thereon and aligned in a row, each of said plurality of compression mounts has one of said plurality of cutting inserts positioned therein in an interference fit.

19. The broach of claim 14, wherein said broach assembly comprises:
a carrier body having a plurality of integral support members aligned in a row and spaced along said carrier body;
a plurality of spacers aligned in said row and coupled to said carrier body, one of said plurality of spacers is located between each adjacent pair of said plurality of support members, each of said adjacent pair of said plurality of support members defines a first support member and a second support member, and said one of said plurality of spacers abutting said first support member; and
one of said plurality of cutting inserts is disposed between each of said second support members and each of said one of said plurality of spacers, and each of said cutting inserts is wedged between said one of said plurality of spacers and second said support member, and wherein said second support member braces a substantial length of said cutting insert during broaching.

20. A broach assembly, comprising:
a carrier body having a plurality of integral support members aligned in a row and spaced alone said carrier body, said plurality of integral support members includes a plurality of pairs of adjacent integral support members, wherein each of said pair of support members including a first support member and a second support member;
a plurality of spacers aligned in said row and coupled to said carrier body, each of said plurality of pairs of support members has one of said plurality of spacers located therebetween and abutting said first support members of each of said pairs of support members; and
a plurality of cutting inserts, wherein one of said plurality of cutting inserts is disposed between said second support members of each of said pairs of support members and said one of said plurality of spacers, and further wherein each of said cutting inserts is wedged between said one of said plurality of spacers and said second support members of each of said pairs of support members, and wherein each of said second support members braces along a substantial length of said cutting insert.

21. The broach assembly of claim 20, wherein each of said plurality of cutting inserts has a lateral support surface which contacts said second support member, said lateral support surface has a substantially non-planer contour for minimizing lateral movement of said cutting insert.

22. The broach assembly of claim 21, wherein said lateral support surface includes a plurality of grooves.

23. The broach assembly of claim 21, wherein said lateral support surface includes at least one of a serrated or ridged surface.

24. The broach assembly of claim 21, wherein said carrier body is elongated in a longitudinal direction, and wherein said plurality of integral support members and said plurality of spacers and said plurality cutting inserts are aligned in a row and oriented substantially parallel with said longitudinal direction.

25. The broach assembly of claim 24, wherein said carrier body includes a first internal fluid flow passageway in fluid communication with a second fluid flow passageway defined in said one of said plurality of spacers and adapted to deliver a fluid through said one of said plurality of spacers to the cutting insert during the broaching operation.

26. The broach assembly of claim 20, wherein said carrier body has an attachment portion configured to be received within a quill of a milling machine.

27. The broach assembly of claim 20, which further includes an attachment member coupled to one end of said carrier body, said attachment member is configured to be received within a quill of a milling machine.

28. A broach assembly, comprising:
a carrier body having a plurality of integral support members aligned in a row and spaced alone said carrier body;
a plurality of spacers aligned in said row and coupled to said carrier body, one of said plurality of spacers being located between an adjacent pair of said plurality of support members, said pair of said plurality of support members defining a first support member and a second support member, and said one of said plurality of spacers abutting said first support member; and a cutting insert disposed between said second support member and said one of said plurality of spacers, said cutting insert being wedged between said one of said plurality of spacers and said second support member, wherein said cutting insert has a lateral support surface which contacts said support member and said lateral support surface has a contour which minimizes lateral movement of said cutting insert, wherein said contour of said lateral support surface includes a v-shaped profile, and further wherein said second support member braces a substantial length of said cutting insert during broaching.

29. The broach assembly of claim 28, wherein said carrier body is elongated in a longitudinal direction, and wherein said plurality of integral support members and said plurality of spacers and said cutting insert is aligned in a row and oriented substantially parallel with said longitudinal direction.

30. The broach assembly of claim 29, wherein said carrier body includes a first internal fluid flow passageway in fluid communication with a second fluid flow passageway defined in said one of said plurality of spacers and adapted to deliver a fluid through said one of said plurality of spacers to the cutting insert during the broaching operation.

31. The broach assembly of claim 28, wherein said carrier body has an attachment portion configured to be received within a quill of a milling machine.

32. The broach assembly of claim 28, which further includes an attachment member coupled to one end of said carrier body, said attachment member is configured to be received within a quill of a milling machine.

33. A broach assembly, comprising:

a carrier body having a plurality of integral support members aligned in a row and spaced alone said carrier body;

a plurality of spacers aligned in said row and coupled to said carrier body, one of said plurality of spacers being located between an adjacent pair of said plurality of support members, said pair of said plurality of support members defining a first support member and a second support member, and said one of said plurality of spacers abutting said first support member; and a cutting insert disposed between said second support member and said one of said plurality of spacers, said cutting insert being wedged between said one of said plurality of spacers and said second support member, wherein said cutting insert has a lateral support surface which contacts said support member and said lateral support surface has a contour which minimizes lateral movement of said cutting insert, wherein said contour of said lateral support surface includes a serrated profile, and further wherein said second support member braces a substantial length of said cutting insert during broaching.

34. The broach assembly of claim 33, wherein said carrier body is elongated in a longitudinal direction, and wherein said plurality of integral support members and said plurality of spacers and said cutting insert is aligned in a row and oriented substantially parallel with said longitudinal direction.

35. The broach assembly of claim 34, wherein said carrier body includes a first internal fluid flow passageway in fluid communication with a second fluid flow passageway defined in said one of said plurality of spacers and adapted to deliver a fluid through said one of said plurality of spacers to the cutting insert during the broaching operation.

36. The broach assembly of claim 33, wherein said carrier body has an attachment portion configured to be received within a quill of a milling machine.

37. The broach assembly of claim 33, which further includes an attachment member coupled to one end of said carrier body, said attachment member is configured to be received within a quill of a milling machine.

* * * * *

UNITED STATES PATENT AND TRADEMARK OFFICE
CERTIFICATE OF CORRECTION

PATENT NO.   : 6,767,168 B2
DATED        : July 27, 2004
INVENTOR(S)  : Raymond T. Miller It is certified that error appears in the above-identified patent and that said Letters Patent is hereby corrected as shown below:

Column 14,
Lines 10 and 63, please change "alone" to -- along --.

Column 15,
Line 38, please change "alone" to -- along --.

Signed and Sealed this

Sixteenth Day of November, 2004

JON W. DUDAS
*Director of the United States Patent and Trademark Office*